United States Patent
Stentz et al.

(10) Patent No.: US 6,363,173 B1
(45) Date of Patent: Mar. 26, 2002

(54) INCREMENTAL RECOGNITION OF A THREE DIMENSIONAL OBJECT

(75) Inventors: Anthony Stentz, Pittsburgh; Keith Lay, Cranberry, both of PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 09/173,073

(22) Filed: Oct. 14, 1998

Related U.S. Application Data

(60) Provisional application No. 60/068,346, filed on Dec. 19, 1997.

(51) Int. Cl.$^7$ ................................................ G06K 9/66
(52) U.S. Cl. ...................................... 382/195; 382/153
(58) Field of Search ................................. 382/195, 196, 382/197, 198, 199, 200, 106, 291, 289, 286, 153, 154

(56) References Cited

U.S. PATENT DOCUMENTS

| | | | | |
|---|---|---|---|---|
| 4,727,492 A | * | 2/1988 | Reeve | 364/424 |
| 5,375,059 A | * | 12/1994 | Kyrtsos et al. | 364/449 |
| 5,471,541 A | * | 11/1995 | Burtnyk et al. | 382/153 |
| 5,602,375 A | * | 2/1997 | Sunahara et al. | 235/384 |
| 5,982,438 A | * | 11/1999 | Lin et al. | 348/415 |

OTHER PUBLICATIONS

K. Gremban & K. Ikeuchi, Appearance–Based Vision and the Automatic Generation Of Object Recognition Programs, Carnegie Mellon University, Department of Computer Science, pp. 1–33, Jul. 1992.

Bolles et al.; 3DPO: A Three–Dimensional Part Orientation System; 1986; pp. 3–26.

Faugeras et al.; The Representation, Recognition, and Location of 3–D Objects; 1986; pp. 27–52.

* cited by examiner

Primary Examiner—Andrew W. Johns
Assistant Examiner—Seyed Azarian
(74) Attorney, Agent, or Firm—Blackwell Sanders Peper Martin

(57) ABSTRACT

The present invention is a method and apparatus for determining the location, orientation, and dimensions of an object using range data from a scanning sensor based on data for a relatively small portion of the object. The present recognition method uses characteristics of a scanning sensor along with the geometrical characteristics of objects that typically receive loads in an earthmoving environment, such as dump trucks. The data from a single scanline provided by a scanning sensor system is processed to determine if there are discontinuities in the scanline. In the present invention, discontinuities in adjacent scanlines are assumed to be in close proximity to each other and to correspond to dominant linear features in a model of the object. The top and bottom edges of an object, such as a dump truck bed, can be located as discontinuities in a single scanline. These discontinuities are used to form possible interpretations of the object's position and orientation. As more scanlines are received, discontinuities that are in close proximity form part of the same interpretation. Lines are also fit to the discontinuities and compared to edges or linear features in the model of an object. Geometric constraints derived from the model are used to eliminate unfeasible interpretations and to confirm feasible interpretations.

27 Claims, 5 Drawing Sheets

|  | INITIAL | LEFT-REAR | REAR-RIGHT | LEFT-RIGHT | LEFT-FRONT | FRONT-RIGHT |
|---|---|---|---|---|---|---|
| LEFT-REAR | possible | possible | null | null | null | null |
| REAR-RIGHT | possible | null | possible | null | null | null |
| LEFT-RIGHT | possible | possible | possible | possible | null | null |
| LEFT-FRONT | null | null | null | possible | possible | null |
| FRONT-RIGHT | null | null | null | possible | null | null |

INCREMENTAL RECOGNITION OF A THREE DIMENSIONAL OBJECT

This application claims benefit of Prov. No. 60/068,346, filed Dec. 19, 1997.

TECHNICAL FIELD

This invention relates generally to determining the position and orientation of an object and, more particularly, to incrementally determining the position and orientation of a planar object to receive a load of material in an earthmoving environment.

BACKGROUND ART

As used in this patent specification the phrase "earthmoving machine" and various approximations thereof refer to excavators, wheel loaders, track-type tractors, compactors, motor graders, agricultural machinery, pavers, asphalt layers, and the like, which exhibit both (1) mobility over or through a work site, and (2) the capacity to alter the topography or geography of a work site with a tool or operative portion of the machine such as a bucket, shovel, blade, ripper, compacting wheel and the like.

While operating earthmoving machinery such as excavators, wheel loaders, and cranes for moving materials from one location to another, human operators visually determine the position and orientation of the object that is to receive the load and control the delivery of material accordingly. For example, in an earthmoving environment, an excavator is used to deliver material to the bed of a dump truck. The operator of the excavator visually determines the position and orientation of the truck bed to be loaded, and delivers the bucket of material to the desired location.

In some applications, autonomous loading and unloading operations take place. A system capable of determining, without the aid of a human operator, the position and orientation of an object that is to receive a load is often required in an autonomous loading system, especially in situations where the location of the loading point varies. Examples include loading systems for dump trucks, flat bed trucks, train cars, hoppers, barges, and cargo ships. In an earthmoving environment, the position and orientation of the object that receives the load, such as a dump truck, varies from one truck to the next as the beds of the trucks are filled and empty trucks arrive to replace them. If the earthmoving machinery is operating autonomously, information on the position and orientation of each truck to be loaded must be provided to the machinery's control system.

In the prior art, systems have been developed to recognize and identify objects. These systems, such as that disclosed in U.S. Pat. No. 5,471,541, issued Nov. 28, 1995 to Burtnyk, et al. typically match image data with models of objects with exact dimensions. The Burtnyk et al. patent utilizes range profiles and synthetic profiles derived from a model. This method also assumes that an approximate pose of the object is known. In some object recognition approaches, the model's pose (position and orientation) are continually updated as model features are matched to the data. See Faugeras and Hebert, "The Representation, Recognition, and Locating of 3-D Objects", The International Journal of Robotics Research, Vol. 5, No. 3, pgs. 27–52. Fall 1986. Another approach to calculating a rigid model's pose is known as the Iterative Closest Point (I.C.P) method presented by Paul J. Besl and Neil D. McKay, in a paper entitled "A method for registration of 3-D shapes" published in IEEE Transactions On Pattern Analysis and Machine Intelligence, Vol. 14 (2), pp. 239–256, 1992. In this method, the data is transformed to fit the model by iteratively minimizing the distance between points in the model and points in the original data set to refine an initial approximate pose of the object. This method assumes that the points associated with the object have been segmented from other points in the scene.

U.S. Pat. No. 5,208,763, issued May 4, 1993 to Hong et al. discloses a method for determining position and orientation of mechanical objects that involves using Euclidean transformations to match the object with a model. U.S. Pat. No. 5,123,057 issued Jun. 16, 1992 to Verly et al. discloses a method using recursive procedures to match detected data to predetermined models and determine "degrees of match" between a subset of data to a subset of model parts. The highest "degrees of match" with the models are used to identify the object.

Bolles and Horaud developed an object recognition system known as 3DPO (three dimensional part orientation system) in which they used a strategy of locating the most promising feature in a three dimensional image of a jumble of parts and using this feature to suggest other features that could confirm their hypothesis and lead them to other features that could completely constrain the pose of an object. In this system they found discontinuities in a single scanline and linked these discontinuities together using a method known as edge chaining to form the linear features that they used to guide their search for objects. This work was presented in a technical paper authored by R. C. Bolles and P. Horaud entitled "3DPO: A Three Dimensional Part Orientation System", The International Journal of Robotics Research, Vol. 5, No. 3, Fall 1986, pp. 3–26.

In some situations, it is desirable to recognize and locate objects of a certain type whose dimensions are known to vary. A method of determining the location, size, and orientation of these objects is therefore required. Further, in situations where several machines must work cooperatively and/or autonomously in an environment, it is important to be able to recognize and determine the location, size, and orientation of objects used for containing or hauling materials. Maximizing the productivity of an automated earth moving machine means that computational efficiency is important to process all the data needed to control the machine without time delays. A system that does not require a full scan of the object and the surrounding area is therefore desirable. It is also desirable to have the capability to track the movement of the objects once they have been recognized. A method and apparatus that may be deployed in a harsh environment, with sensor systems capable of supplying data of limited resolution and accuracy is also desired.

Accordingly, the present invention is directed to overcoming one or more of the problems as set forth above.

DISCLOSURE OF THE INVENTION

The present invention is a method and apparatus for recognizing and determining the location and orientation of an object using incremental range data from a scanning sensor. The present recognition method takes advantage of characteristics of data provided by scanning sensors along with the geometrical characteristics of objects that typically receive loads in an earthmoving environment, such as dump trucks. The data from a single scanline provided by a scanning sensor system is processed to determine if there are discontinuities in the scanline. Since a single scanline is acquired in a relatively short period of time, the geometric relationships of features in the scanline is preserved, even given sensor motion that is unmeasured. The present method also takes advantage of the fact that discontinuities in adjacent scanlines should be in close proximity to each other and should correspond to dominant features in a model of the object. The top and bottom edges of an object, such as a dump truck bed and prominent changes in the terrain, can be located as discontinuities in a single scan line. These discontinuities are used to form possible interpretations of the object's position and orientation. As more scanlines are received, discontinuities that are in close proximity are given similar labels. Lines are also fit to the discontinuities and are compared to edges in one or more models that are possible interpretations of the object. Geometric constraints derived from the model are used to eliminate unfeasible interpretations and to confirm feasible interpretations. If a feasible interpretation can be formed, then the object of interest is assumed to be recognized. The best interpretation, based on the number of scanlines used and the most model features found, is processed to determine the best position and orientation of the object. As scanlines are received, the position and orientation of the object is continually updated and provided to other subsystems for controlling other machinery. An assumption may also be used regarding the general orientation of the object that receives the load with respect to the loading machine. The present recognition method reduces time delay compared to methods that require a scan of the entire object and surrounding area and that wait until after the scan is completed to begin processing the data to determine the position and orientation of the object.

The present method locates discontinuities, builds linear features, and uses geometric constraints derived from the object model using methods that are well known in the art. The present method of building partial interpretations of the object with only part of the scene data and the use of a state table to guide this process are unique aspects of this method.

BEST MODE CARRYING OUT THE INVENTION

Figure 1:
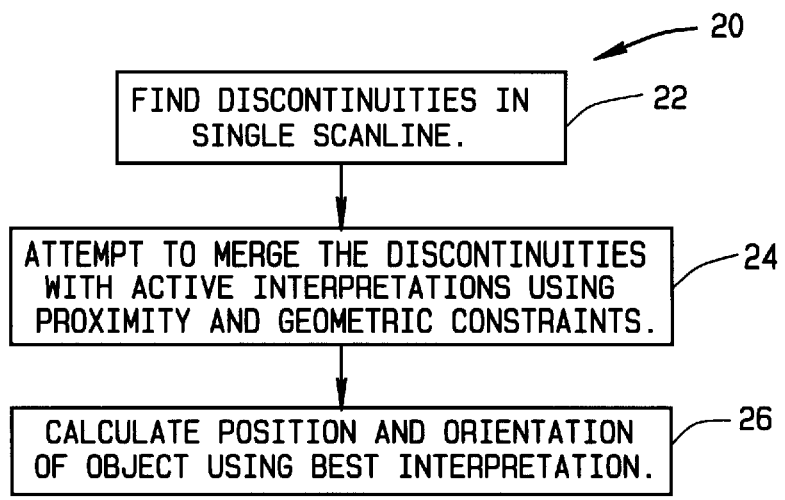
FIG. 1 is a flowchart representation of the method steps associated with the present invention.

Referring now to the drawings, FIG. 1 shows a flowchart 20 of the steps involved in the data processing method associated with the present invention including: (a) find the discontinuities in a single scanline 22 using the fact that discontinuities are not obscured by sparse range data or loading machine motion; (b) attempt to merge the discontinuities in the current scanline with each interpretation on an active interpretation list using proximity and geometric constraints 24; (c) calculate the position and orientation of the object using the best interpretation 26. These steps are further explained hereinbelow.

Figure 2:
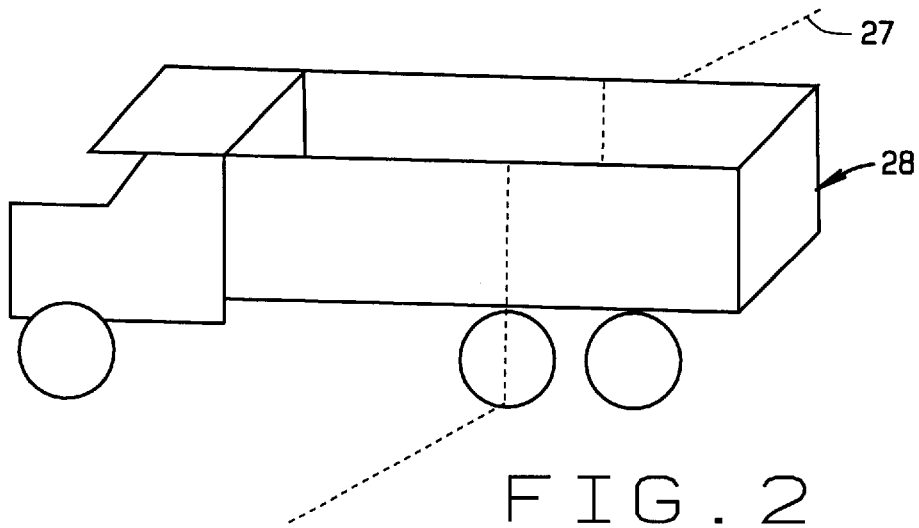
FIG. 2 is a perspective view of a diagram of a dump truck showing a scanline with discontinuities.

In the first step 22 of the flowchart 20, discontinuities in the data from one vertical rotation of a scanning sensor, i.e. a scanline, are determined. A discontinuity is an abrupt change in the direction of the range points in a scanline. In FIG. 2, a single scanline 27 is shown across a diagram of a dump truck 28. Three different methods may be used alone or in combination to locate discontinuities in a scanline including:

(1) Attempt to fit line segments to range data in a single scan line. When the error from the line segment being fit grows past a threshold, then label this point as a discontinuity and begin a new line segment.

(2) Check the distance between successive points in a scan line. When this distance exceeds a threshold, label these points as discontinuities.

(3) Look for jumps in the height value (z-coordinate) of the points in the scan line.

Figure 3:
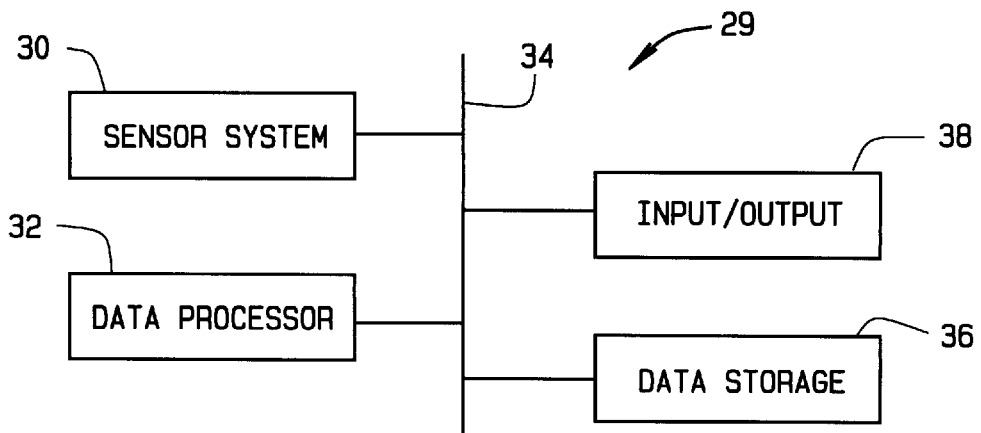
FIG. 3 is a block diagram of a system that may be used to implement the method according to the present invention.

FIG. 3 shows a simplified block diagram of a processing system 29 that may be used to implement the present invention. The image or range data is obtained from a scanning sensor system 30 including, for example, systems based on radar, laser, infrared, and sonar sensors. The method associated with the present invention may be implemented in computer software which is executed on a data processor 32 such as a microprocessor. The components in the processing system 29 may be connected to data transfer means 34, such as a data bus or an alternative transmission and reception system, such as radio, satellite, infrared, cable, etc. which allows data to be transferred between one or more sensor systems 30, data storage units 36, data input/output devices 38, and data processors 32.

In order to determine the position and orientation of an object from range data of a scene, the present invention compares features found in the scene to models of objects stored in a database. The data storage units 36 store range data from the sensor system 30, and other information required by the processing system 29. The storage units 36 also contain a database of information for models of objects that may be compared to the scene range data to determine if there is any correlation between the object in the scene and any of the models. This model database includes information on the type of object each model represents as well as geometric characteristics including average width, length, and height of the model. The model database also includes information regarding the linear features that correspond to discontinuities in vertical scanlines of the object. The linear features are represented by a vector indicating the direction of the principle axis of the line in three-dimensional space and by two endpoints.

One or more scanning sensor systems are often positioned on moving machinery such as an excavator or wheel loader. Despite movement and vibration of the machinery, accurate determination of discontinuities in the scanlines may still be accomplished if the sampling frequency of the range scanner (for example, 5 to 15 kilohertz) is significantly greater than the frequency of motion of the machinery (for example, 1 to 10 Hertz). Due to the difference in frequencies, the geometric properties of each scanline are preserved even when the machine is digging, dumping, or being driven from one location to another.

The next step in the algorithm 20 shown in FIG. 1 is to merge the discontinuities in a scanline with interpretations about the possible location of the, dump truck's bed using geometric and proximity constraints 24. Proximity constraints are implemented by assuming that discontinuities in adjacent scanlines that correspond to the same geometric feature in an object should have similar locations (i.e., be proximate to one another). An interpretation is a set of object model features with corresponding matches to scene features. The present invention uses partial scene data to make interpretations about the position and orientation of an object using the following variables:

(1) state—an identifier indicating the hypothesis for which features of an object are currently being scanned;

(2) feature points—the discontinuity points associated with the particular object features;

(3) feature lines—the best fit line through the feature points, consisting of a unit vector for the direction and the two endpoints of the unit vector;

(4) feature specific information—depends on the object and the task to be accomplished, for instance, for a dump truck, this consists of an offset distance in height because the linear features are the edges of the truck bed and, therefore, the lines are shifted up by the maximum offset from a line through the centroid to ensure that the bucket of the earthmoving machine passes over the edges of the dump truck;

(5) centroid—a centroid is calculated for each linear feature from the range data points; and (6) elimination—a Boolean value indicating whether the particular interpretation should be eliminated after it has been used to form all possible new interpretations.

Figure 4:
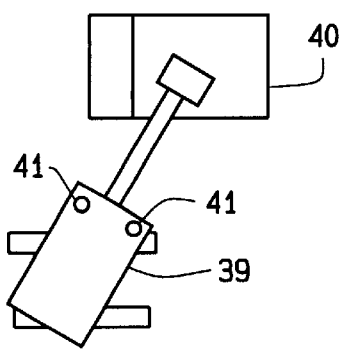
FIG. 4 is a top plan view of a dump truck positioned in a drive-by orientation with respect to an excavator.
Figure 5:
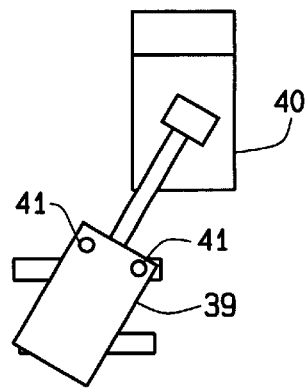
FIG. 5 is a top plan view of a dump truck positioned in an end-loading orientation with respect to an excavator.

Assumptions with regard to operations at an earthmoving site may be used to simplify developing interpretations. First, it may be assumed that the heading for an object is within a given range. For instance, as shown in FIGS. 4 and 5, an operator of an excavator 39 or wheel loader (not shown) usually indicates whether the dump truck 40 should be parked in what is known as a drive-by loading position as shown in FIG. 4 or an end-loading position as shown in FIG. 5. Another assumption is that the dump truck 40 is scanned from back to front. Other assumptions may be used depending on the situation.

Figure 6:
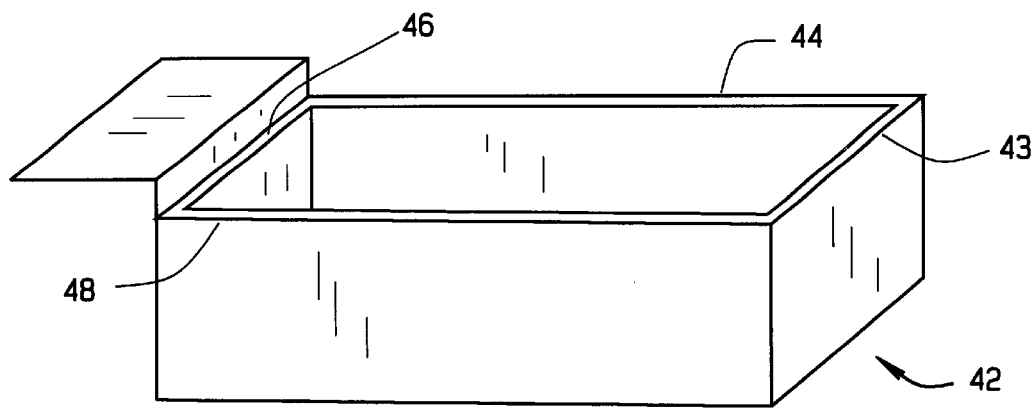
FIG. 6 is a perspective view of a diagram of a dump truck bed.
Figure 8:
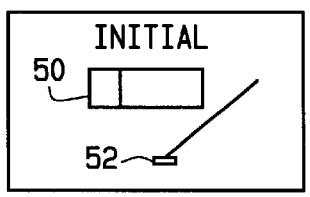
FIG. 8 shows machine and scanning sensor locations with respect to a dump truck bed for given states.
Figure 8:
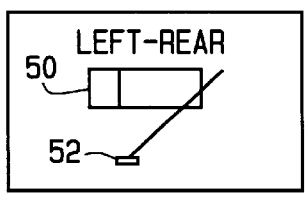
Figure 8:
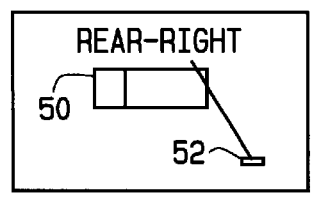
Figure 8:
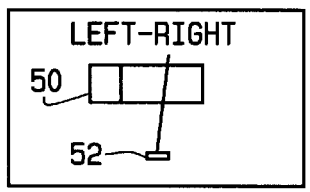
Figure 8:
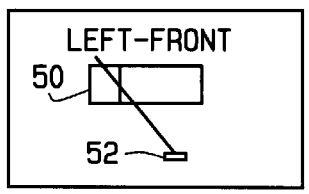
Figure 8:
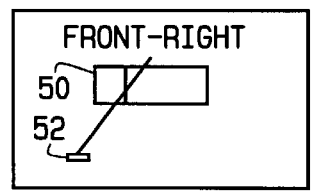
Figure 8:
Figures 7, 9:
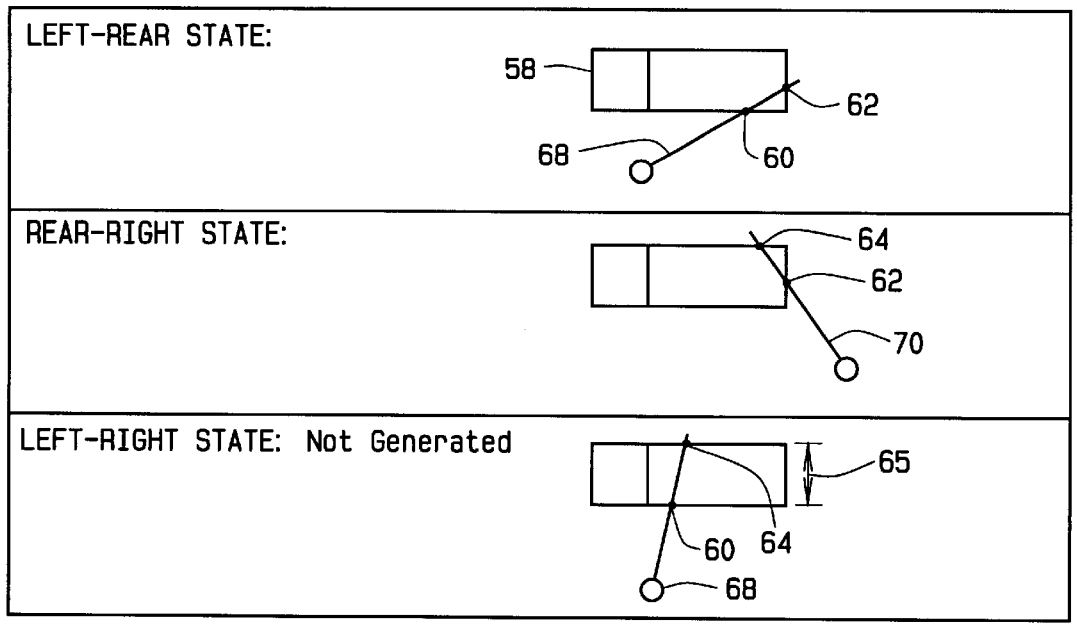
FIG. 7 is a state table to guide the generation of interpretations.
FIG. 9 shows initial states generated by the present invention from a scan of a dump truck bed.

Using these assumptions, a state table, such as shown in FIG. 7 is then created to guide the process of generating interpretations as the object is scanned by one or more scanning sensor systems 41 on the earthmoving machine 39. The state table may be preprogrammed in memory, or an off-line processing means may generate the table and store it in memory. Limiting the features that must be matched reduces computational requirements. In the case of a dump truck bed model 42 as shown in FIG. 6, the location and orientation of the truck bed can be determined using the top rims 43, 44, 46, 48 of the sides of the truck bed 42. In the state table shown in FIG. 7, the column headings are the possible states that are considered at each scanline. The row headings are the possible states that can be entered. If a cell is labeled possible, then it is possible to transition from the state in the column heading to the state indicated by that row. The INITIAL state means that no scanlines with 2 or more discontinuities that are within the height range of the top of the truck sides have been encountered. FIG. 8 indicates the possible positions of the scanning sensor system 52 located on an earthmoving machine and the dump truck 50 when the dump truck 50 is in a drive-by position. When in the INITIAL state in FIG. 7, the state could possibly be LEFT-REAR, in which the left and rear sides of the truck have been crossed, or it could be REAR-RIGHT, in which the rear and right sides of the truck have been crossed, or LEFT-RIGHT, in which the left and right sides have been crossed. The processing method is organized around the state table in FIG. 7. The table entries are pointers to functions that check the possibility of the given interpretation and generate new interpretations if possible. Data points from each new scanline are processed for discontinuities and then the current list of interpretations is used to check whether the data from the new scanline can be combined to form a new interpretation.

As scanlines are received they are processed to find discontinuities. The location of the discontinuities with respect to the machine are checked to eliminate discontinuities that cannot be part of the truck rim. Currently this is based on a minimum height and a minimum distance to the loading machine, such as a wheel loader or excavator. The discontinuities are then sorted according to their distance from the loading machine.

The discontinuities in the initial scan line are used to generate interpretations about the possible location of the dump truck's bed. For instance, when initially intersecting the truck 58 as shown in FIG. 9, the two discontinuities on the scanline cause two new interpretations to be generated, LEFT-REAR 60, 62 and REAR-RIGHT 62, 64. The LEFT-RIGHT 60, 64 interpretation can be eliminated because the discontinuities near the corner will be less than a minimum width 65 apart. This minimum width 65 is considered part of the information from the truck model. Because there is no previous data to help eliminate the REAR-RIGHT 62, 64 interpretation, both LEFT-REAR and REAR-RIGHT have to be generated. The list of interpretations from a scanline 68, 70 with two discontinuities that is the first scanline encountered with more than one discontinuity is the following:

1. State: LEFT-REAR, number of scanlines=1, (using discontinuities 60, 62 from first scanline 68)
2. State: REAR-RIGHT, number of scanlines=1, (using discontinuities 62, 64 from first scanline 70)
3. State: INITIAL, initial number of scanlines=0, (no discontinuities)

If there is noise in the data provided by the scanning sensor system, the data processing system may flag more than two discontinuities in a scanline. In this situation, two additional interpretations would be generated for each additional discontinuity. If the processing system detects only two discontinuities in succeeding scanlines, the interpretations generated due to noise will not be considered good interpretations and will be removed from the active interpretation list.

Assuming no scanlines with discontinuities due to noise, if the second scanline contains two discontinuities, then an attempt is made to combine the two discontinuities with the three interpretations listed above. At this point only the distance between the discontinuities is checked. Directions are not checked until 3 or more scanlines have been processed. Therefore, each interpretation generates one additional set of interpretations, except for the INITIAL state which generates two states. The list of interpretations after processing the second scanline consists of the following seven interpretations.

1. State: LEFT-REAR, number of scanlines=2, (using discontinuities from second and first scanlines)
2. State: REAR-RIGHT, number of scanlines=2, (using discontinuities from second and first scanlines)

3. State: LEFT-REAR, number of scanlines=1, (using discontinuities from second scanline)
4. State: REAR-RIGHT, number of scanlines=1, (using discontinuities from second scanline)
5. State: LEFT-REAR, number of scanlines=1, (using discontinuities from first scanline)
6. State: REAR-RIGHT, number of scanlines=1, (using discontinuities from first scanline)
7. State: INITIAL, number of scanlines=0, (no discontinuities)

Figure 10:
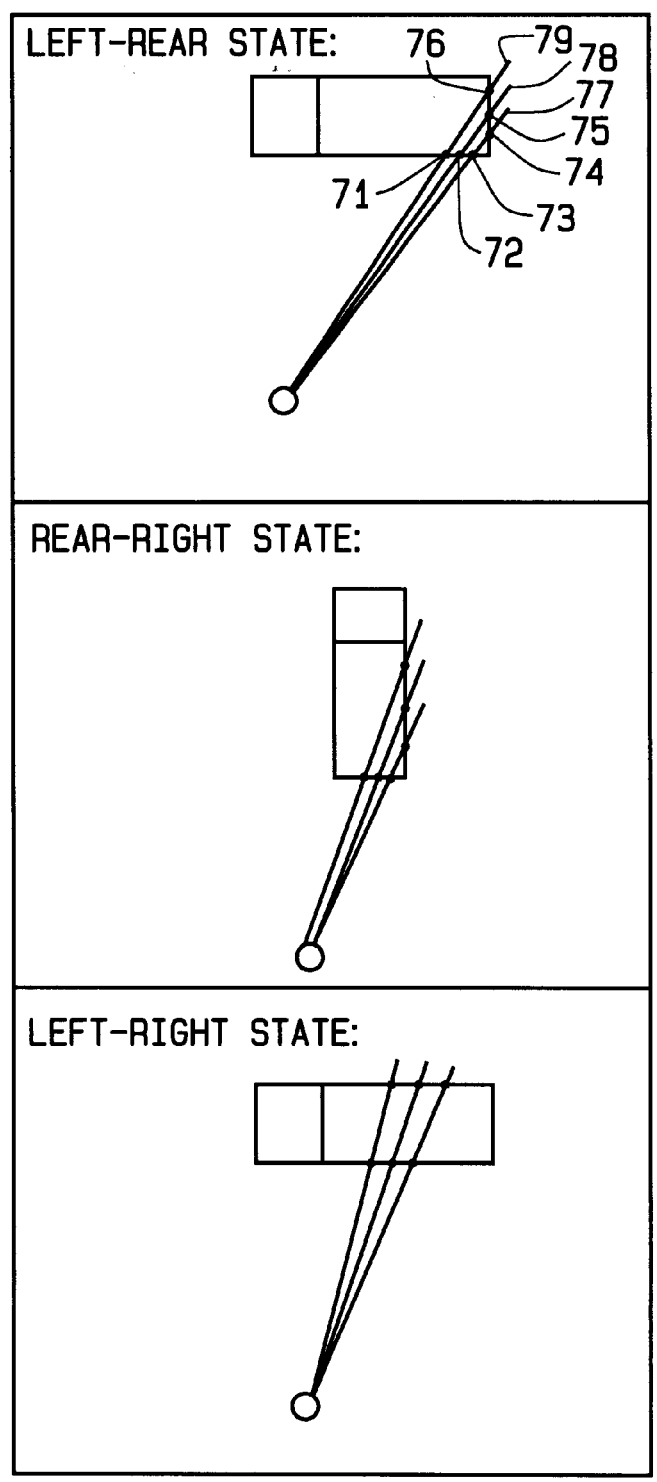
FIG. 10 shows use of multiple scanlines to evaluate interpretations.

FIG. 10 illustrates the data points (or discontinuity points) 71, 72, 73, 74, 75, 76 used from three scanlines 77, 78, 79 to determine that the LEFT-REAR state meets the geometric and directional constraints. When the third valid scanline 79 is received, the seven interpretations on the current list are used to generate new interpretations. However, at this point, a line is fit through the data points associated with each pertinent linear feature, such as the data points 71, 72, 73 associated with the top left rim, and the angles between features in the model are checked. When a feature has more than two data points, then constraints are checked using the principle axis through the set of points to eliminate invalid interpretations. The method of fitting lines is discussed hereinbelow. A third scanline with two discontinuities would yield the interpretation list below:

1. State: LEFT-REAR, number of scanlines=3, (using discontinuities from all 3 scanlines)
2. State: LEFT-REAR, number of scanlines=2, (using discontinuities from third and second scanlines)
3. State: REAR-RIGHT, number of scanlines=2, (using discontinuities from third and second scanlines)
4. State: LEFT-REAR, number of scanlines=2, (using discontinuities from third and first scanlines)
5. State: REAR-RIGHT, number of scanlines=2, (using discontinuities from third and first scanlines)
6. State: LEFT-REAR, number of scanlines=2, (using discontinuities from second and first scanlines)
7. State: REAR-RIGHT, number of scanlines=2, (using discontinuities from second and first scanlines)
8. State: LEFT-REAR, number of scanlines=1, (using discontinuities from second scanline)
9. State: REAR-RIGHT, number of scanlines=1, (using discontinuities from second scanline)
10. State: LEFT-REAR, number of scanlines=1, (using discontinuities from first scanline)
11. State: REAR-RIGHT, number of scanlines=1, (using discontinuities from first scanline)
12. State: INITIAL, number of scanlines=0, (no discontinuities)

Note that if it is assumed that the dump truck 50 is in a drive-by orientation with respect to the loading machine and scanner 52 as shown in FIG. 8, only the LEFT-REAR state meets the geometric constraints when using information from all three of the scanlines that have been received up to this point.

As each new scanline is received, new interpretations are generated based on the state of interpretations on the active list. After each scanline is processed and the new interpretations are generated, the new interpretations are added to the front of the list and the old interpretations are kept at the end of the list. It is clear that this process could cause the interpretation list to grow to be very large, particularly when there are more than 2 valid discontinuities per scanline. For this reason, the list may be limited when the number of states grows larger than a maximum number, which is set to include the desired number of interpretations, such as a limit of 20. After the list is updated, it is searched for the best dump truck description based on the number of scanlines used in an interpretation and the number of model features which have been matched. The best feature is always placed at the beginning of the list. Currently the method used to find the best feature is the following:

For each interpretation in the list:
(1) Count the number of features that have more than two points.
(2) Count the number of discontinuities that have been used in the solution. This is the number of hits.
(3) If the number of features are more than the previous best truck description and the number of hits is greater than the previous best truck description, then make this interpretation the best interpretation and stop iterating through the list.

If no interpretation was found matching the above criteria, then for each interpretation in the list:
(1) Count features
(2) Count hits
(3) If number of features are equal to the previous best truck description and the number of hits is greater than the previous best truck description, then make this interpretation the best interpretation and stop iterating through the list.

One action that is not described in the example above is that a state can be eliminated after it has been used to generate more states. If a state generates an identical state, then only the state with the most information is kept. This eliminates some of the redundant states that would be kept on the active list otherwise. This may cause problems if a point which is not really the edge of the truck bed is incorporated into the feature. For example, if a mound of dirt were spilling over the edge of the truck bed, then the solution may incorporate a point off the dirt mound and this would drive up the average noise of the lines on the linear feature as well as move the line toward the direction of the noise point. However, as long as the truck bed edge is not completely obscured then points on the truck bed edge should have better linear fits.

The linear features forming the model of the truck bed may be represented by a line formed by using two of the points associated with the model feature, the first point and the most current point. Although this method is efficient, it is not a very accurate representation of the feature. In order to represent the feature accurately, a line should be fit through the points in three dimensions. One method for doing this is to find the principle axes of the set of points associated with a particular feature. These axes are found using principle components analysis. The 3×3 covariance matrix of the set of points is found. The partial sums that are used to construct the covariance matrix are stored to allow faster computation as the discontinuities from a new scanline are considered. The eigenvectors of the covariance matrix of the points associated with a feature give the direction of the principle axes in space. The direction of the three dimensional line is given by the eigenvector that has the largest eigenvalue. This is the vector in our representation of the linear features. This operation is performed often because each state on the interpretation list generates new states according to the state table and each of these can involve 1 or 2 features that require new line fits. A method allowing an initial guess at the eigenvectors and eigenvalues could reduce the computation time in this application because once the eigenvectors are found, they change very little as each new point is added.

Figure 11:
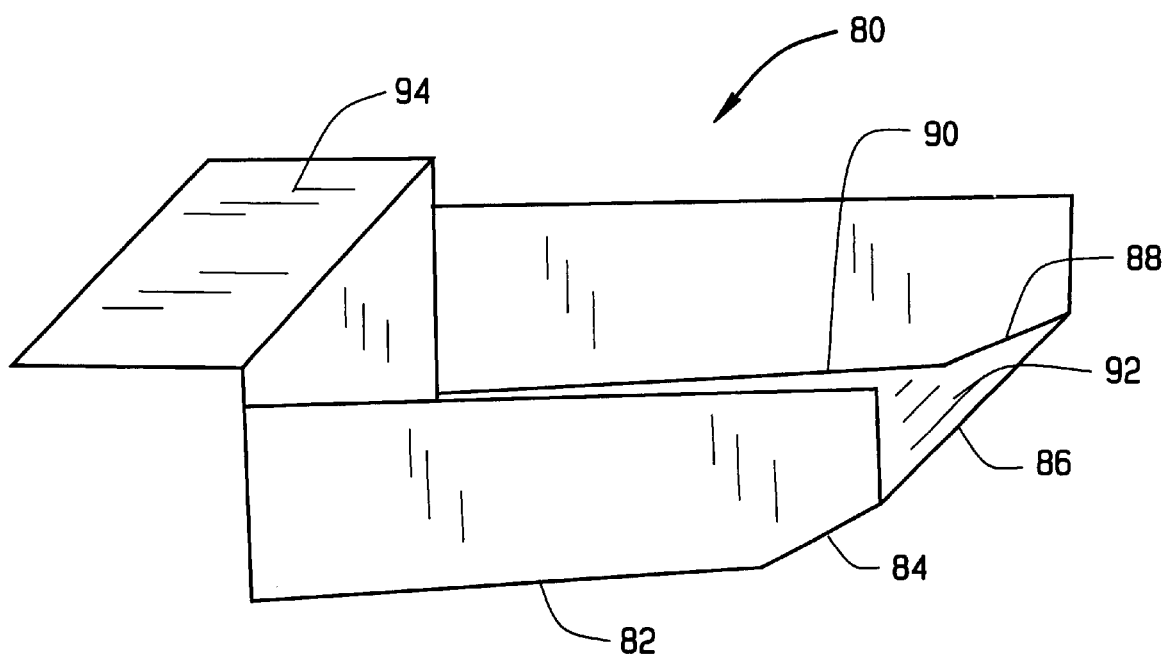
FIG. 11 is a perspective view of a diagram of a dump truck bed.

The models in the database consist of the features that are constructed by processing the vertical scanlines from a range scan of the object to find the discontinuities in each scanline. Only the features that correspond to discontinuities in vertical scanlines of the object are used in the model. Examples of these features are indicated by the bold lines for the rims 43, 44, 46, 48 in FIG. 6. The linear features are represented by a vector indicating the direction of the principle axis of the line in three-dimensional space and by two endpoints. FIG. 11 shows a model for a dump truck bed 80 with other linear features such as bottom edges 82, 84, 86, 88, 90 that may be represented in the database as well as sides 92, 94 with angular relationships that are different from the model shown in FIG. 6. General dimensions of the model such as length, width, and height are also provided with the model information. The models may be stored in a model-centered coordinate system and the features transformed to other coordinate systems for use in the functions called from the state table. In addition to the dump truck beds shown in FIGS. 6 and 11, models for other objects having linear features may also be stored in the database.

As mentioned above the state table can be generated by an off-line process. With the current invention the state table was generated manually and the software functions that are called by the state table was generated manually and the software functions that are called by the state table are also manually written. A method that could generate the state table and the software functions called by the state table based on a model description would allow this method of incremental object recognition to be applied to any object which has an allowable model description.

Another embodiment of the present invention allows a state table and software to be automatically configured by simulating the scanning of an object model and determining possible states that can be transitioned to from a given state. Geometric constraints that determine possible states that can be transitioned to from the current state is automatically encoded using information from the object model. This process may be performed off-line using a model of the sensor and a planar model of the object. Several simulated scans of the object model are performed in the range of position and orientations that are possible for the object with respect to a loading machine such as an excavator. A state table is generated by combining the sets of states generated from the simulated scans of the object model. The required information for the functions that determine the state transitions typically consists of the angle between features, the length of features, the proximity distance for a particular feature, and the direction of the cross product of two linear features. General functions which determine if the discontinuities in a scanline cause the system to remain in the same state and/or transition to a new state are called with the specific model information. The off-line system allows the method to be used with more than one type of model and to be tuned for use with sensors at various scanning rates, sampling resolutions, and beam widths.

Industrial Applicability

The present invention allows the object to be recognized as it is being scanned, thus eliminating the time for collecting the data from the recognition process. The approach is robust to errors in a scanning sensor system that resides on the automated loading machine. It also handles sparse data from low resolution sensors that can function in harsh environmental conditions. On subsequent passes of the scanner, the method can be used to track and verify that the object is in the same place as when previously located. The dimensions of each truck may vary, therefore, the truck bed dimensions must be recovered for each new truck.

Partial descriptions of the object are used by software planning functions to plan the actions of a hydraulic excavator (HEX) or a wheeled type loader to load a container, such as a dump truck, railroad car, flat bed truck, or a hopper. In the automated mass excavation application, a HEX motion planner plans the movement of the machine needed to move a bucket of material from the soil face and dump it into the truck bed. Another planning module, a dump planner, chooses the goal location inside the truck bed in which the HEX will dump the material. Both of these modules require knowledge of the position of the truck. The present invention provides information regarding the object that may be used by other systems including the object's corner points (left front, left rear, right front, right rear, and depth point), truck bed dimensions (length, width, depth of bed), truck position information (height, heading in world coordinate system), and data flags indicating whether valid data exists for the solution points and dimensions listed above.

Other aspects, objects and advantages of the present invention can be obtained from a study of the drawings, the disclosure and the appended claims.

What is claimed is:

1. A method for determining the position, size, and orientation of an object having at least one linear feature based upon range data from a plurality of scanlines provided by a sensor system scanning the object, and utilizing a data processing system including a database of numerical data corresponding to at least one model having at least one linear feature, the method comprising the steps of:
    (a) locating discontinuities in the scanlines as they are received;
    (b) using a state table of expected features to generate a list of active interpretations of the object using the model information and the locations of the discontinuities from only partial range data of the object;
    (c) evaluating the interpretations to determine the most valid interpretation which is the interpretation with the most matched features that have a minimum amount of data up to the current scanline; and
    (d) calculating the position and orientation of the object using the interpretation that most closely matches the object.

2. The method as set forth in claim 1 wherein step (a) further comprises locating discontinuities in a scanline by attempting to fit line segments in the scanline range data and marking a range point as a discontinuity when the error from a line segment being fit is beyond a threshold value.

3. The method as set forth in claim 1 wherein step (a) further comprises locating discontinuities in a scanline by checking the distance between successive range data points in a scanline and labeling a point as a discontinuity when the distance exceeds a threshold.

4. The method as set forth in claim 1 wherein step (a) further comprises locating discontinuities in a scanline by detecting differences in height values of range data points in the scanline that exceed a threshold.

5. The method as set forth in claim 1 wherein generating the list of active interpretations in step (b) further comprises at least one best fit line through range data points associated with the at least one linear feature of the object consisting of a unit vector and two endpoints.

6. The method as set forth in claim 1 wherein generating the list of active interpretations in step (b) further comprises calculating the centroid for a planar region associated with the at least one linear feature of the object.

7. The method as set forth in claim 1 wherein step (c) further comprises using proximity constraints to limit the number of interpretations to compare, the proximity constraints being based on discontinuities in adjacent scanlines corresponding to the same linear feature of an object.

8. The method as set forth in claim 1 wherein step (c) further comprises using geometric constraints to limit the number of interpretations to compare.

9. An apparatus for determining the position, size, and orientation of an object having at least one linear feature comprising:

a data processing system including a data storage device and a data processor, the data storage device including range data scanlines of the object, and data corresponding to at least one model having at least one linear feature, the data processor being operable to locate discontinuities in the scanlines, generate a list of active interpretations of the object using the model database and the locations of the discontinuities, compare discontinuities with the active interpretations on a scanline by scanline basis to find the interpretation that most closely matches the object, and calculate the position and orientation of the object using the interpretation that most closely matches the object based on the data available.

10. The apparatus as set forth in claim 9 wherein the data processor is operable to locate discontinuities in a scanline by fitting line segments to range data in a scanline and marking a range point as a discontinuity when the error from a line segment being fit is beyond a threshold value.

11. The apparatus as set forth in claim 9 wherein the data processor is operable to locate discontinuities in a scanline by checking the distance between successive range data points in a scanline and labeling a point as a discontinuity when the distance exceeds a threshold.

12. The apparatus as set forth in claim 9 wherein the data processor is operable to locate discontinuities in a scanline by detecting differences in height values of range data points in the scanline that exceed a threshold.

13. The apparatus as set forth in claim 9 wherein the interpretation comprises at least one best fit line through the at least one linear feature of the object consisting of a unit vector and two endpoints.

14. The apparatus as set forth in claim 9 wherein the interpretation comprises a centroid for the range points associated with the at least one linear feature of the object.

15. The apparatus as set forth in claim 9 wherein the data processor is operable to use proximity constraints to limit the number of interpretations to compare, the proximity constraints being based on discontinuities in adjacent scanlines corresponding to the at least one linear feature of an object.

16. The apparatus as set forth in claim 9 wherein the data processor is operable to use geometric constraints to limit the number of interpretations to compare.

17. An apparatus for determining the position, size, and orientation of an object in an earthmoving environment, the object having at least one linear feature comprising:

a data processing system including a data storage device and a data processor, the data storage device including range data scanlines of the object provided by a scanning sensor system, and data corresponding to at least one model having at least one linear feature, the data processor being operable to locate discontinuities in the scanlines, generate a list of active interpretations of the object using the model database and the locations of the discontinuities, compare discontinuities with the active interpretations on a scanline by scanline basis to find the interpretation that most closely matches the object, and calculate the position and orientation of the object using the interpretation that most closely matches the object based on the data available.

18. The apparatus as set forth in claim 17 wherein the object is the bed of a dump truck.

19. The apparatus as set forth in claim 18 wherein the scanning sensor system is located at an earthmoving machine positioned adjacent the bed of the dump truck, the scanning sensor system operable to generate substantially vertical scanlines of the bed of the dump truck, the scanlines being adjacent to one another from the rear to the front of the dump truck bed.

20. An apparatus for recognizing an object and determining the position, size, and orientation of the object in a scene of the earthmoving environment, the object having at least one linear feature comprising:

a data processing system including a data storage device and a data processor, the data storage device including range data scanlines of the object provided by a scanning sensor system, and data corresponding to at least one model having at least one linear feature, the data processor being operable to simulate the scanning of the object using a model of the object, generate a state table indicating possible orientations of the object in the earthmoving environment using data from the simulated scanning, locate discontinuities in the range data scanlines, generate a list of active interpretations of the object using the model database and the locations of the discontinuities, compare discontinuities with the active interpretations to find the interpretation that most closely matches the object, and calculate the position and orientation of the object using the interpretation that most closely matches the object.

21. The apparatus as set forth in claim 20 wherein the state table is generated using geometric constraints of the object model that determine possible states that can be transitioned to from a given state.

22. The apparatus as set forth in claim 20 wherein a plurality of simulated scans of the object model are performed over a range of possible positions and orientations for the object with respect to a loading machine.

23. The apparatus as set forth in claim 20 wherein the state transitions are determined using angles between features of the object model, the length of features, proximity distance for a particular feature, and direction of the cross product of two linear features.

24. The apparatus as set forth in claim 20, wherein the determination of whether to transition to a new state is made using object model information including proximity of features in a scanline to common features in the previous state, the angle between scene features and the angle between possible model features matched with the scene features, the direction of the incremental scene features and the direction of the possible model features matched to these scene features.

25. The apparatus as set forth in claim 20 wherein the object model is scanned using a simulated sensor model having variable scanning rates.

26. The apparatus as set forth in claim 20 wherein the object model is scanned using a simulated sensor model having variable sampling resolutions.

27. The apparatus as set forth in claim 20 wherein the object model is scanned using a simulated sensor model having variable beam widths.

* * * * *

UNITED STATES PATENT AND TRADEMARK OFFICE
CERTIFICATE OF CORRECTION

PATENT NO. : 6,363,173 B1
DATED : March 26, 2002
INVENTOR(S) : Lay et al.

It is certified that error appears in the above-identified patent and that said Letters Patent is hereby corrected as shown below:

<u>Title page,</u>
Item [75], Inventors: Keith Lay, Cranberry; Anthony Stentz, Pittsburgh, both of PA (US).

<u>Column 10,</u>
Line 25, delete Claim 1 and insert Claim 1 as follows:
-- 1. A method for determining the position, size, and orientation of an object having at least one linear feature based upon range data from a plurality of scanlines provided by a sensor system scanning the object, and utilizing a data processing system including a database of numerical data corresponding to at least one model having at least one linear feature, the method comprising the steps of:
    (a)    locating discontinuities in the scanlines as they are received;
    (b)    fitting at least one line to at least two of the located discontinuities by connecting the at least two located discontinuities;
    (c)    using a state table of expected features to generate a list of active interpretations of the object using the model information and the at least one line connecting the locations of the at least two located discontinuities from only partial range data of the object;
    (d)    evaluating the interpretations to determine the most valid interpretation which is the interpretation with the most matched features that have a minimum amount of data up to the current scanline;
and
  (e) calculating the position and orientation of the object using the interpretation that most closely matches the object. --

<u>Column 11,</u>
Line 11, delete Claim 9 and insert Claim 9 as follows:
-- 9. An apparatus for determining the position, size, and orientation of an object having at least one linear feature comprising:
a data processing system including a data storage device and a data processor, the data storage device including range data scanlines of the object, and data corresponding to at least one model having at least one linear feature, the data processor being operable to locate discontinuities in the scanlines, fit at least one line to at least two located discontinuities by connecting the at least two located discontinuities, generate a list of active interpretations of the object using the model database and the at least one line connecting the locations of the at least two located discontinuities, compare discontinuities with the active interpretations on a scanline by scanline basis to find the interpretation that most closely matches the object, and calculate the position and orientation of the object using the interpretation that most closely matches the object based on the data available. --

UNITED STATES PATENT AND TRADEMARK OFFICE
CERTIFICATE OF CORRECTION

PATENT NO.    : 6,363,173 B1
DATED         : March 26, 2002
INVENTOR(S)   : Lay et al.

It is certified that error appears in the above-identified patent and that said Letters Patent is hereby corrected as shown below:

Column 11,
Line 56, delete Claim 17, and insert Claim 17 as follows:
-- 17. An apparatus for determining the position, size, and orientation of an object in an earthmoving environment, the object having at least one linear feature comprising:
a data processing system including a data storage device and a data processor, the data storage device including range data scanlines of the object provided by a scanning sensor system, and data corresponding to at least one model having at least one linear feature, the data processor being operable to locate discontinuities in the scanlines, fit at least one line to a least two located discontinuities by connecting the at least two located discontinuities, generate a list of active interpretations of the object using the model database and the at least one line connecting the locations of the at least two located discontinuities, compare discontinuities with the active interpretations on a scanline by scanline basis to find the interpretation that most closely matches the object, and calculate the position and orientation of the object using the interpretation that most closely matches the object based on the data available. --

Column 12,
Line 16, delete Claim 20 and insert Claim 20 as follows:
-- 20. An apparatus for recognizing an object and determining the position, size, and orientation of the object in a scene of the earthmoving environment, the object having at least one linear feature comprising: a data processing system including a data storage device and a data processor, the data storage device including range data scanlines of the object provided by a scanning sensor system, and data corresponding to at least one model having at least one linear feature, the data processor being operable to simulate the scanning of the object using a model

UNITED STATES PATENT AND TRADEMARK OFFICE
CERTIFICATE OF CORRECTION

PATENT NO. : 6,363,173 B1
DATED : March 26, 2002
INVENTOR(S) : Lay et al.

It is certified that error appears in the above-identified patent and that said Letters Patent is hereby corrected as shown below:

<u>Column 12 cont'd</u>.
 of the object, generate a state table indicating possible orientations of the object in the earthmoving environment using data from the simulated scanning, locate discontinuities in the range data scanlines, fit at least one line to at least two located discontinuities by connecting the at least two located discontinuities, generate a list of active interpretations of the object using the model database and the at least one line connecting the locations of the at least two located discontinuities, compare discontinuities with the active interpretations to find the interpretation that most closely matches the object, and calculate the position and orientation of the object using the interpretation that most closely matches the object. --

Signed and Sealed this

Twenty-fifth Day of June, 2002

*Attest:*

JAMES E. ROGAN
*Attesting Officer*     *Director of the United States Patent and Trademark Office*